United States Patent
Hoblit

(10) Patent No.: US 7,647,369 B2
(45) Date of Patent: Jan. 12, 2010

(54) APPARATUS, SYSTEM, AND METHOD FOR SECURELY ASSOCIATING OWNERSHIP INFORMATION WITH AN ELECTRONIC DEVICE

(75) Inventor: Robert S. Hoblit, Raleigh, NC (US)

(73) Assignee: Lenovo (Singapore) Pte Ltd., Central 1 (SG)

( * ) Notice: Subject to any disclaimer, the term of this patent is extended or adjusted under 35 U.S.C. 154(b) by 676 days.

(21) Appl. No.: 11/363,634

(22) Filed: Feb. 28, 2006

(65) Prior Publication Data

US 2007/0204041 A1 Aug. 30, 2007

(51) Int. Cl.
*G06F 15/16* (2006.01)
(52) U.S. Cl. ............... 709/200; 709/225; 726/5; 726/28; 361/679
(58) Field of Classification Search ........... 709/200, 709/225, 232; 726/5, 28, 35; 361/679
See application file for complete search history.

(56) References Cited

U.S. PATENT DOCUMENTS

| 5,592,361 | A | * | 1/1997 | Smith et al. | 361/679 |
| 6,321,335 | B1 | * | 11/2001 | Chu | 726/28 |
| 6,609,207 | B1 | | 8/2003 | Cromer et al. | 713/202 |
| 2001/0009498 | A1 | | 7/2001 | Oross et al. | 361/681 |
| 2001/0038525 | A1 | | 11/2001 | Urban et al. | 361/686 |
| 2002/0104028 | A1 | | 8/2002 | Liebenow et al. | 713/202 |
| 2003/0084352 | A1 | | 5/2003 | Schwartz et al. | 713/202 |
| 2003/0217151 | A1 | * | 11/2003 | Roese et al. | 709/225 |

FOREIGN PATENT DOCUMENTS

| JP | 07-104882 | 4/1995 |
| JP | 2000-181561 | 6/2000 |

OTHER PUBLICATIONS

Sahasrabudhe, R. "*Laptop Security System*", Research Disclosure, No. 451, Nov. 2001, Article 136, p. 1950.
"*Tamper Evident Stickers*", MetalCraft I.D. Plates and Labels, http://www.idplate.com/tamper_evident_stickers/default.html.

\* cited by examiner

*Primary Examiner*—Salad Abdullahi
*Assistant Examiner*—El Hadji M Sall
(74) *Attorney, Agent, or Firm*—Kunzler & McKenzie

(57) ABSTRACT

An apparatus, system, and method are disclosed for securely associating ownership information with an electronic device with a plurality of modules configured to functionally execute the necessary steps of securely associating ownership information with an electronic device. These modules in the described embodiments include a presentation component coupled to an electronic device, the presentation component configured to present ownership information; a latch connected to the presentation component and the electronic device, the latch configured to restrict access to the ownership information; and a controller coupled to the latch, the controller configured to free the latch to permit access to the ownership information. Beneficially, such an apparatus, system, and method would allow easy identification of the proper possessor of an electronic device and reduce the incidence of theft of the electronic device.

22 Claims, 6 Drawing Sheets

APPARATUS, SYSTEM, AND METHOD FOR SECURELY ASSOCIATING OWNERSHIP INFORMATION WITH AN ELECTRONIC DEVICE

BACKGROUND OF THE INVENTION

1. Field of the Invention

This invention relates to the field of electronic devices and more particularly relates to an electronic device securely associated with ownership information.

2. Description of the Related Art

Electronic devices are high value equipment. These electronic devices are especially vulnerable to theft due to their proliferation in recent years. It is commonplace to see individuals with electronic devices, and whether or not the user in possession has a right to possess the device is usually not questioned. Some owners attach security plates to the outside of a device to associate it with the appropriate user; others issue asset passes. Neither solution adequately associates ownership information with a device, as plates and passes are easily forged, and in many cases, only the tag itself is checked; the tag is not verified against the asset itself, and since the tags are easily removable, it is relatively easy for someone to inappropriately claim possession of a device.

From the foregoing discussion, it should be apparent that a need exists for an apparatus, system, and method that associates ownership with an electronic device. Beneficially, such an apparatus, system, and method would allow easy identification of the proper possessor of an electronic device and reduce the incidence of theft of the electronic device.

SUMMARY OF THE INVENTION

The present invention has been developed in response to the present state of the art, and in particular, in response to the problems and needs in the art that have not yet been fully solved by currently available electronic devices. Accordingly, the present invention has been developed to provide an apparatus, system, and method for securely associating ownership information with an electronic device that overcome many or all of the above-discussed shortcomings in the art.

A method of the present invention is presented for securely associating ownership information with an electronic device. In one embodiment, the method includes coupling a presentation component with an electronic device, the presentation component configured to display ownership information; connecting a latch to the presentation component and the electronic device, the latch configured to restrict access to the ownership information; and coupling a controller to the latch, the controller configured to permit a user to access the ownership information.

The method also may include a controller configured to free the latch in response to a credential, in one embodiment. In another embodiment, the presentation component may comprise a transparent pane and an encasement configured to contain a business card having ownership information. In a further embodiment, the presentation component is configured to show evidence of tampering attempts.

The electronic device may comprise substantially any portable computing device in one embodiment of the invention. In another embodiment, the controller is configured to allow an authenticated user to change the ownership information.

In one embodiment, an apparatus to securely associate ownership information with an electronic device is provided with a plurality of modules configured to functionally execute the necessary steps of the present invention. These modules include a presentation component integrated with an electronic device, the presentation component configured to present ownership information; a latch connected to the presentation component and the electronic device, the latch configured to restrict access to the ownership information; and a controller coupled to the latch, the controller configured to free the latch to permit a user to access the ownership information.

The controller described in the apparatus, in one embodiment, is configured to free the latch in response to a credential. In another embodiment, the controller is configured to encrypt stored authentication information associated with a user. In a further embodiment, the controller comprises a user interface configured to allow an authorized user to change the credential and/or the ownership information.

The apparatus is further configured, in one embodiment, with the presentation component comprising a transparent pane and an encasement configured to contain a message media comprising ownership information. In another embodiment, the presentation component is further configured to show evidence of tampering attempts.

In a further embodiment, the electronic device may comprise a portable computing device.

A system of the present invention is also presented to securely associate ownership information with an electronic device. The system may include an electronic device, a presentation component, a latch and a controller. The electronic device may comprise a portable computing device. The presentation component may be integrated with the electronic device. Preferably, the latch connects to the presentation component and the electronic device. The latch is configured to restrict access to ownership information. The controller is configured to allow a user to access the ownership information.

In one embodiment, the controller is configured to free the latch in response to a credential. The credential may authenticate the user. The system may further include a user interface configured to allow an authenticated user to modify the credential.

The system may further include a presentation component comprising a transparent pane visible on an external surface of the electronic device, and an encasement configured to contain a message media comprising ownership information. In another embodiment, the presentation component described in the system is configured to show evidence of an unauthorized attempt to access the message media.

In another apparatus the presentation component is integrated with a portable device. The presentation component is configured to display ownership information. A latch connected to the presentation component and the portable device restricts access to the ownership information. A lock coupled to the latch frees the latch to permit access to the ownership information.

In one embodiment, the apparatus includes a lock configured to free the latch in response to the turning of a key. In another embodiment, the electronic device described in the apparatus comprises a portable computing device.

A method of the present invention is also presented for securely associating ownership information with an electronic device. The method in the disclosed embodiments substantially includes the steps necessary to carry out the functions presented above with respect to the operation of the described apparatus and system. In one embodiment the method includes receiving a credential, comparing the credential to stored ownership information, and permitting access to the ownership information stored in a locked presentation component affixed to the electronic device in response to the credential satisfying the authentication information. In one embodiment, the credential comprises a password. The authentication information may be encrypted.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
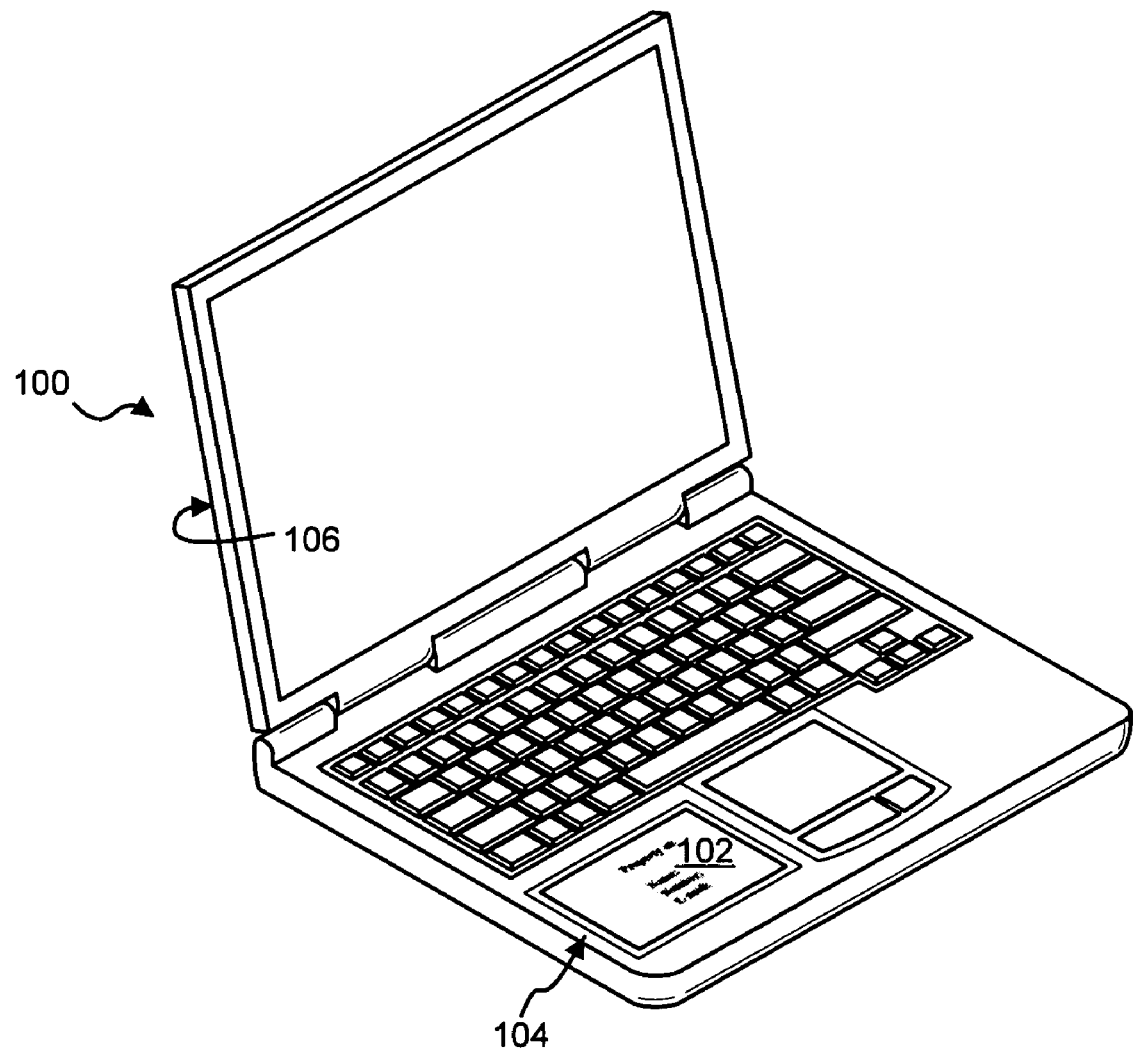
FIG. 1 is a perspective view drawing illustrating one embodiment of an electronic device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an electronic device 100 with securely associated ownership information 102 in accordance with the present invention. The electronic device 100 includes a presentation component 104. The presentation component 104 displays and/or may optionally contain ownership information 102 for the electronic device 100.

The electronic device 100 may be any electronic device which an owner would be concerned about keeping identified. Examples of electronic devices include computers, monitors, copiers, printers, televisions, appliances, and the like. The electronic device 100, in one embodiment, comprises a portable electronic device 100. Examples of portable devices 100 include, but are not limited to, cell phones, music players, projectors, office equipment, laptop computers, tablet computers, handheld computers, and the like.

In one embodiment, the presentation component 104 contains or displays ownership information 102. Preferably, the presentation component 104 is securely connected to the electronic device 100. In the illustrated embodiment, the presentation component 104 is positioned for high visibility when the electronic device 100 is in use. In another embodiment, the presentation component 104 may be located on an exterior surface 106 of the electronic device 100. For example, the presentation component 104 may be on the exterior surface 106 opposite a display screen. On an exterior surface 106, the presentation component 104 can be readily inspected without opening the device 100. Thus, determining that a possessor of an electronic device 100 has the right to possess the electronic device 100 is quick and simple.

The presentation component 104 maybe integrated with the electronic device 100. In such an embodiment, the presentation component 104 cannot be removed from the electronic device 100. However, the presentation component 104 still permits access to ownership information 102.

In another embodiment, the presentation component 104 can be completely removed from the electronic device 100 by an authorized user and replaced with another presentation component 104. In this embodiment, ownership information 102 may be permanently marked on the presentation component 104. The ownership information 102 may be printed, stamped, or otherwise affixed to the presentation component 104. When the authorized possessor changes, a new presentation component 104 associated with the new authorized possessor can be securely attached to the electronic device 100.

The ownership information 102, in one embodiment, identifies an authorized possessor or owner. The ownership information 102 may comprise a message media such as an asset tag, a business card, an ID tag, or the like. The ownership information 102 may identify an authorized possessor or owner by including a name, a photograph, an identification number, a combination of these, or the like.

FIG. 1 illustrates one embodiment of the invention having a presentation component 104 integrated with an electronic device 100 embodied as a portable computer. The presentation component 104 contains and displays ownership information 102 in the form of a business card. Other embodiments of the present invention considered to be within the scope of the present invention will be apparent to one skilled in the art.

Figure 2:
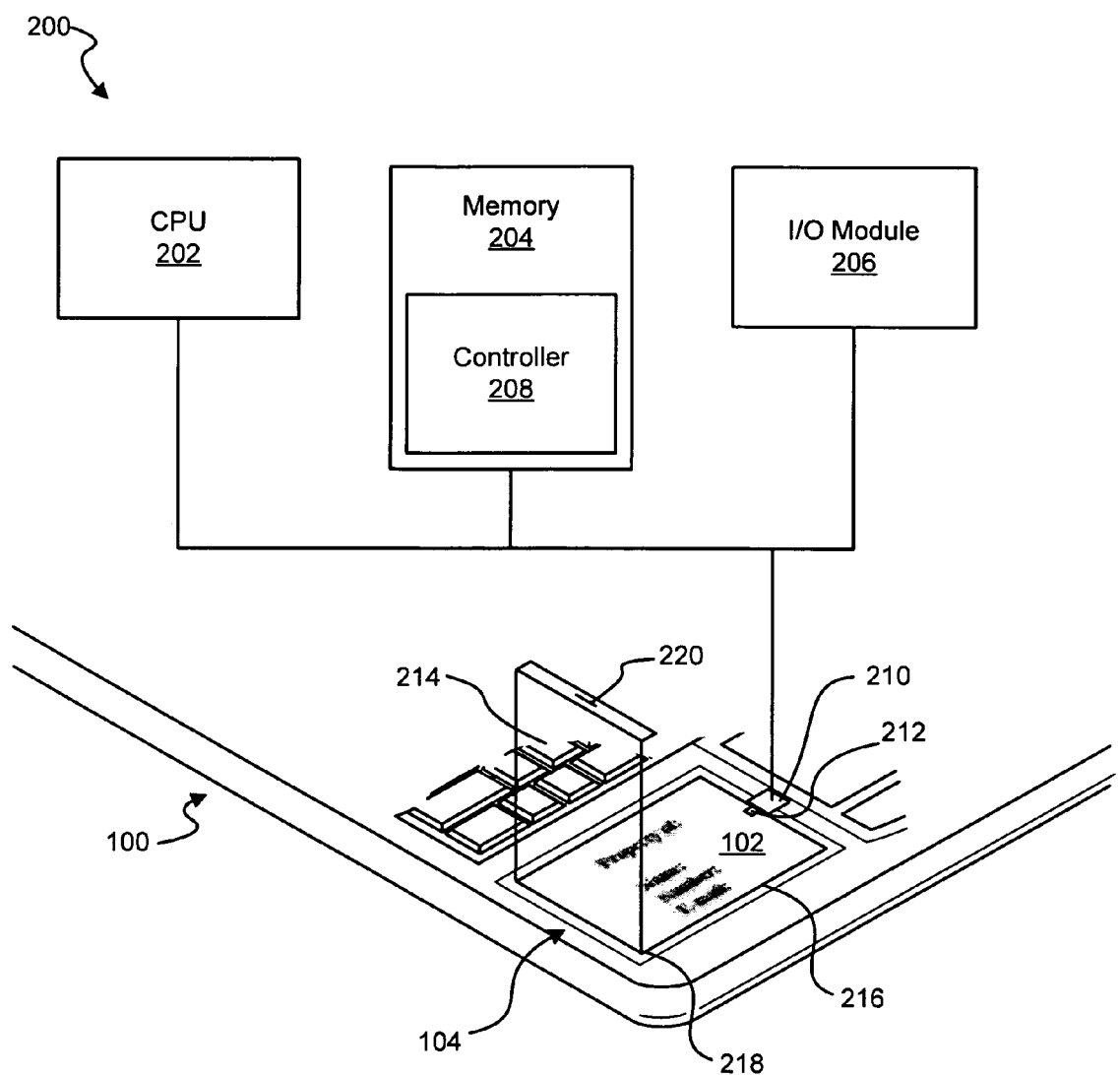
FIG. 2 is a schematic block diagram illustrating one embodiment of an electronic device in accordance with the present invention.

FIG. 2 illustrates one embodiment of an apparatus 200 for securely associating ownership information with an electronic device. The apparatus 200 includes a presentation component 104 integrated with an electronic device 100 and configured to present ownership information 102. The apparatus 200 also includes a central processing unit (CPU) 202, memory 204, an input output module (I/O module) 206, a controller 208, an actuator 210, and a latch 212.

The CPU 202 processes information and executes instructions stored in the memory 204 to determine if a user should be granted access to the ownership information 102. The CPU 202 may be a general purpose device such as Intel™ CPUs, AMD™ CPUs, and the like. The CPU 202 may also be a special purpose device such as a Hitachi H8™ or the like. In one embodiment, the CPU 202 is the CPU of the electronic device 100.

In one embodiment, the memory 204 stores authentication information that is used to determine whether to permit access to the ownership information 102. The memory 204 also stores a controller 208 comprising software instructions configured to control access to the ownership information 102. The memory 204 is in communication with the CPU 202 and passes authentication information and software instructions to the CPU 202. Preferably, the memory 204 is nonvolatile memory such as a programmable read only memory (PROM), a continuously powered random access memory (RAM), a flash memory, or the like. The memory 204 may be the general purpose memory used by the electronic device 100, or in the alternative, it may be special purpose memory used to control access to the ownership information 102.

The I/O module 206 receives input from a user. The input serves as a credential that authenticates a user. The input may comprise a password, a keycode, a number, biometric information such as a fingerprint, or the like. The I/O module 206 connects to a variety of I/O devices (not shown) that provide the user input. Examples of IO devices include a keyboard, a biometric scanner, a button, or the like. The I/O module 206 is in communication with the CPU 202, the memory 204, and the controller 208.

The controller 208 processes input from the I/O module 206 to determine if the input satisfies the authentication information stored in the memory 204. If the input satisfies the authentication information, the controller 208 toggles the actuator 210 between a released state and a secured state. Alternatively, the authentication information may be stored in a smartcard, RFID tag, or other security device configured to interact with the controller 208 to verify the input. As will be appreciated by those skilled in the art, a variety of types and configurations of controller 208 can be utilized without departing from the scope and spirit of the present invention. For example, in one embodiment, the controller 208 may be software instructions. In another embodiment, the controller 208 may be a special purpose device such as a Hitachi H8™.

In one embodiment, the presentation component 104 comprises a transparent pane 214 and an encasement 216. The encasement 216 contains the ownership information 102. The transparent pane 214 protects the ownership information 102 from damage or alteration and allows the ownership information 102 in the encasement 216 to be readily observed.

The encasement 216 may be configured to contain ownership information 102 in the form of a business card, an asset tag, an ID card, or the like. The encasement 216 may be constructed from the same material as the electronic device 100, or the encasement 216 may be constructed from a different material, such as plastic, metal, or the like.

Preferably, the presentation component 104 readily opens and closes based on authorized operation of the actuator 210. The transparent pane 214, in the illustrated embodiment, rotates on a hinge 218 when freed from the latch 212 to open and allow access to the ownership information 102. In one embodiment, the hinge 218 or encasement 216 may include a spring (not shown) to facilitate opening of the transparent pane 214. The ownership information 102 can then be altered, removed, and/or replaced. When the transparent pane 214 is closed, access to the ownership information 102 is restricted. The transparent pane 214 may be constructed from any clear, durable material, such as plastic, glass, or the like.

Variations of this embodiment are considered within the scope of the present invention and will be apparent to one skilled in the art. For example, in another embodiment, the transparent pane 214 is permanently fixed to the encasement 216. Releasing the latch 212 may open a pathway (not shown) for insertion or removal of ownership information 102. In another embodiment, the transparent pane 214 comprises a material that shows evidence of attempts to tamper with the presentation component 104. Examples of this type of tamper evident material include glass that cracks or breaks readily during tampering, plastic that cracks, breaks, or crazes during tampering, and the like. Other tamper evident material may include plastic that deforms and remains deformed after minimal force is applied. Alternatively, the tamper evident material may include a marker such as an ink that is released when attempts are made to open the presentation component 104 without authorization. In one embodiment, the transparent pane 214 is made of tamper-evident material such as CYRO Industries' XT® polymer 375TE acrylic-based multipolymer compound.

In one embodiment, the controller 208 communicates with the actuator 210 coupled to the latch 212. When activated by the controller 208 the actuator 210 moves the coupled latch 212, changing the state of the latch 212 from secured to released or released to secured. In one embodiment, the actuator 210 may comprise a solenoid coupled to the latch 212. In this embodiment, the solenoid moves the latch 212 to change the state of the latch 212 between secured and released.

As will be appreciated by one skilled in the art, a variety of types and configurations of configurations of actuator 210 can be utilized without departing from the scope and spirit of the present invention. For example in one embodiment, the actuator 210 may comprise a motor coupled to the latch 212. In this embodiment, the motor moves the latch 212 to change the state of the latch 212 between secured and released.

The latch 212 restricts access to the ownership information 102. In one embodiment, the latch 212 is connected to the presentation component 104 and the electronic device 100. The latch 212 is configured to repeatedly secure and release the transparent pane 214. In a secured state, the latch 212 restricts access to the ownership information 102 such that the ownership information 102 cannot be changed. In a released state, the latch 212 allows access to the ownership information 102 so that the ownership information 102 can be replaced, removed, or modified.

In one embodiment, the latch 212 may be embodied as a pin slidably connected to the electronic device 100. In the secured state, the latch 212 engages a receiver 220 on the presentation component 104. The receiver 220 may comprise a hole, a tab, or a slot. The latch 212 is configured to slide to disengage the receiver 220 on the presentation component 104 and allow access to the ownership information 102. The latch 212 may be constructed from any material strong enough to restrict access to the ownership information 102, such as metal, plastic, and the like. Of course, the latch 212 may be connected to the presentation component 104 and engage a receiver 220 connected to the encasement 216 or chassis of the electronic device 100.

As will be appreciated by those skilled in the art, a variety of types and configurations of latch 212 can be utilized without departing from the scope and spirit of the present invention. For example, in one embodiment, the latch 212 may comprise a covering over a pathway sized to accept and receive ownership information 102 that leads to the ownership information 102. When the latch 212 is secured, the covering blocks the pathway to the ownership information 102, thus preventing modification of the ownership information 102. When the latch 212 is released, the covering reveals the pathway to the ownership information 102 and allows modification of the ownership information 102.

Figure 3:
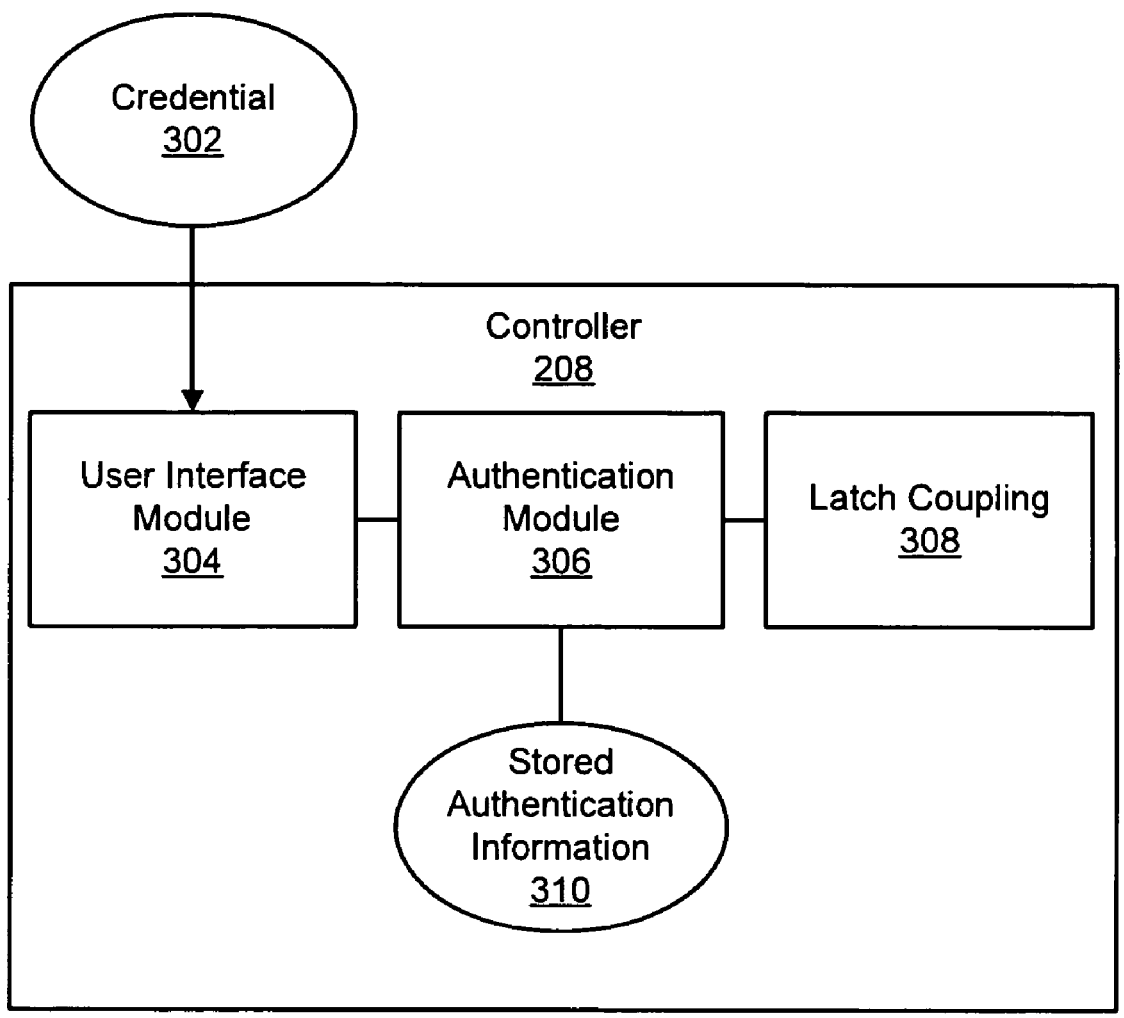
FIG. 3 is a schematic block diagram illustrating one embodiment of an electronic device in accordance with the present invention.

FIG. 3 depicts a schematic block diagram of a controller 208 for controlling access to ownership information 102 in response to a user-supplied credential 302. The controller 208 comprises a user interface module 304, an authentication module 306, a latch coupling 308, and stored authentication information 310.

The credential 302 is an identifier that establishes the right of a user to modify the ownership information 102. A user with the proper credential 302 is an authenticated user with the right to modify the ownership information 102. When the proper credential 302 is supplied to the controller 202 through the user interface module 304, the controller allows access to the ownership information 102. In one embodiment, the credential 302 is an alphanumeric password typed at a keyboard.

As will be appreciated by those skilled in the art, a variety of types and configurations of credential 302 can be utilized without departing from the scope and spirit of the present invention. For example, in one embodiment, the credential 302 comprises a biometric identifier, such as a thumbprint, a retina, or the like. In another embodiment, the credential 302 comprises a mechanical key.

The user interface module 304 provides a way for a user to supply a credential 310 to the controller 208 to verify the user's right to modify the ownership information 102. The user interface module 304 passes the credential 302 to the authentication module 306. In one embodiment, the user interface module 304 prompts a user for the credential 302 on a display (not shown). The user interface module 304 may receive a password at a keyboard (not shown) as a credential 310 and deliver the password to the authentication module 306.

As will be appreciated by those skilled in the art, a variety of types and configurations of user interface module 304 can be utilized without departing from the scope and spirit of the present invention. For example, in one embodiment, the credential 302 comprises a biometric identifier, such as a fingerprint, a retina, and the like. The user interface module 304 may comprise an I/O device that reads the biometric identifier and passes a representation of that identifier on to the authentication module 306. In yet another embodiment, the credential may comprise a mechanical key, and the user interface module 304 may comprise a lock which accepts the mechanical key.

The authentication module 306 establishes the validity of a credential 302, and thus, the user's right to access the ownership information 102. The authentication module 306 compares the credential 302 delivered from the user interface 304 with the stored authentication information 310. Given the proper credential 302, the stored authentication information 310 is satisfied in the comparison of the credential 302 with the stored authentication information 310, and the user supplying the credential 302 is deemed an authorized user.

In one embodiment, the authentication module 306 establishes that the stored authentication information 310 is satisfied when the credential 302 is an exact match with the stored authentication information 310. In another embodiment, the authentication module 306 retrieves and decrypts encrypted stored authentication information 310. When the credential 302 matches the decrypted stored authentication information 310, the stored authentication information 310 is satisfied. In a different embodiment, the authentication module 306 performs a transformation on the stored authentication information 310 and compares the credential 302 to the transformed stored authentication information 310. When the credential 302 matches the transformed stored authentication information 310, the stored authentication information 3 10 is satisfied.

The latch coupling 308 couples the authentication module 306 to the latch 212 and changes the state of the latch 212 between a released state and a secured state. The authentication module 306 activates the latch coupling 308 as a result of the stored authentication information 310 being satisfied, thus allowing an authenticated user access to the ownership information 102. In one embodiment, the latch coupling 308 comprises an actuator 210 that moves the latch 212.

As will be appreciated by those skilled in the art, a variety of types and configurations of latch coupling 308 can be utilized without departing from the scope and spirit of the present invention. For example, in one embodiment, the latch coupling 308 comprises a connection that is moved by the credential, such as by the turning of a key.

The stored authentication information 310 determines the proper credential 302 required to verify the authority of a user to modify the ownership information 102. In one embodiment, the credential 302 comprises a password, and the stored authentication information 310 comprises an exact duplicate of the password.

As will be appreciated by those skilled in the art, a variety of types and configurations of stored authentication information 310 can be utilized without departing from the scope and spirit of the present invention. For example, in one embodiment, the stored authentication information 310 comprises an encrypted version of the password. In yet another embodiment, the stored authentication information 310 comprises a transformed version of the password.

The stored authentication information 310 may also consist of a representation of biometric information when the credential 302 consists of a biometric identifier, such as a thumbprint, a retina, or the like. In another embodiment, the stored authentication information 310 may comprise a lock configured to respond to the appropriate key.

In one embodiment, the stored authentication information 310 may be modified by a user with authority to modify the ownership information 102. An example of this embodiment would be allowing a user to input a new password after supplying the correct password. After the stored authentication information 310 has been changed, a user must input a corresponding, new credential 302 to become an authorized user.

One embodiment of a controller as illustrated in FIG. 3 is a user interface module 304 comprising a keyboard and a display that receives a credential 302 comprising a password. The password is delivered to the authentication module 306 that compares the password to a decrypted version the stored authentication information 310, which is an encrypted version of the password. If the decrypted stored authentication information 310 and the password match, the stored authentication information 310 is satisfied, and the latch coupling 308, comprising a motor, changes the state of the latch 212 between secured and released.

Figure 4:
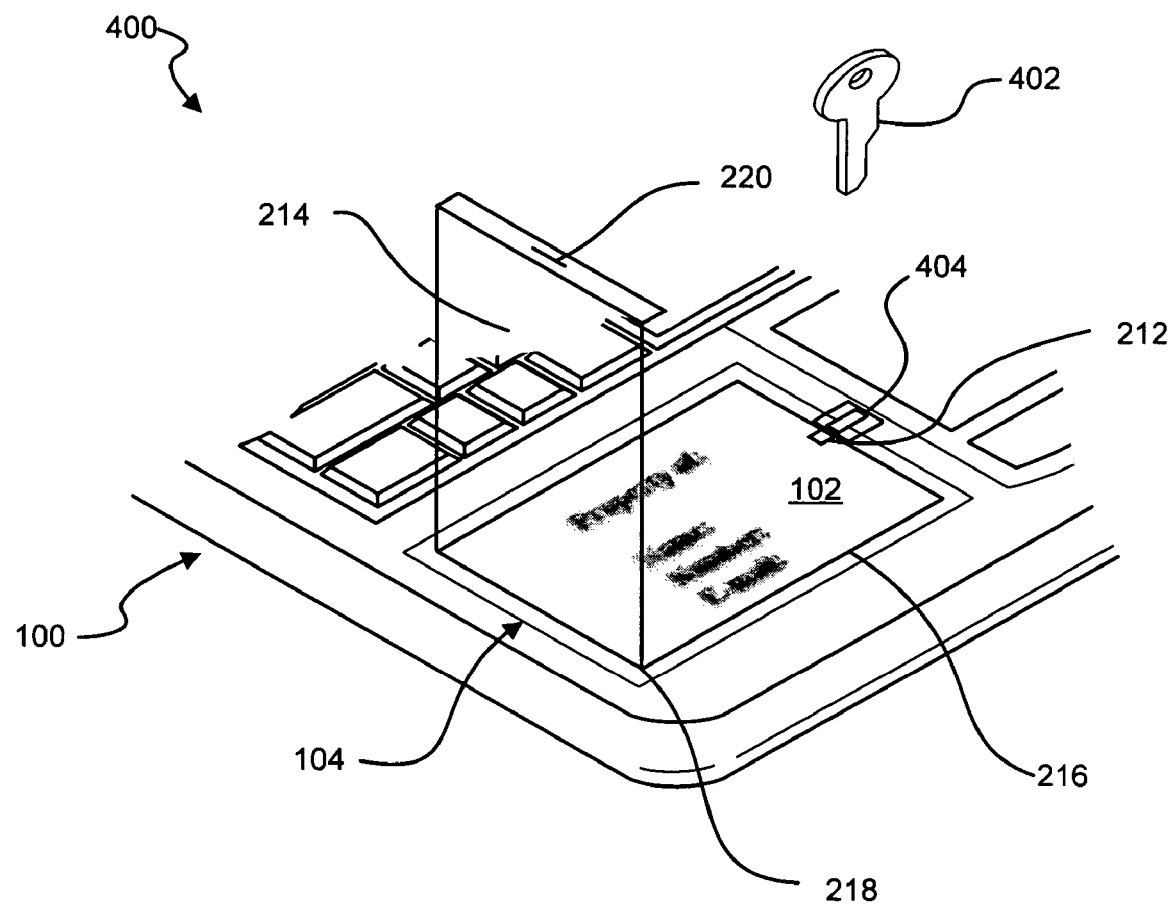
FIG. 4 is a perspective drawing illustrating one embodiment of an electronic device in accordance with the present invention.

FIG. 4 illustrates an alternative embodiment of an apparatus 400 for securely associating ownership information 102 with an electronic device 100. The apparatus 400 includes an electronic device 100, ownership information 102, a coupled presentation component 104, a latch 212, a key 402, and a lock 404. The electronic device 100, ownership information 102, presentation component 104, and latch 212 are preferably configured in a manner similar to like numbered components described above in relation to FIGS. 1 and 2. In this embodiment, the lock 404 and key 402 cooperate to control access to the ownership information 102.

The key 402 may comprise a conventional tumbler lock key. Typically, the lock 404 is operated by inserting and turning the key 402. This rotation moves the latch 212, changing the state of the latch 212 between secured and released.

The lock 404 controls engagement of the latch 212 and the receiver 220. Using the proper key 402, the lock 404 can be locked or unlocked to selectively permit access to the ownership information 102. In one embodiment, the lock 404 may comprise a tumbler lock operated by a key 402. Preferably, the key 402 is configured to operate exclusively with the lock 404. In certain embodiments, a single key 402 may operate a plurality of locks 404 installed on various electronic devices.

As will be appreciated by one skilled in the art, a variety of types and configurations of locks 404 and corresponding keys 402 may be utilized without departing from the scope and spirit of the present invention. For example, the lock 404 may comprise a security lock such as those used for product control in retail outlets and DVD rentals. The key 402 in such an embodiment comprises a standard key that opens a plurality of security locks. The key 402 may be heavy and/or difficult to duplicate. In another embodiment, the lock 404 may comprise a magnetically controlled lock 404 with a key 402 comprising a corresponding magnetic key. Placing the magnetic key 402 into an appropriate position relative to the magnetic lock 404 changes the state of the latch 212 between secured and released.

In one embodiment, the latch 212 is embodied as a tab rotatably connected to the electronic device 100 or the lock 404. Rotation of the key 402 in the lock 404 rotates the tab. In the secured state, the latch 212 engages a receiver 220 extending from the transparent pane 214. The latch 212 is configured to enter a released state by rotating around a rotatable connection (not shown) and disengaging the receiver 220 on the transparent pane 214, allowing access to the ownership information 102. The latch 212 may be constructed from any material strong enough to restrict access to the ownership information 102, such as metal, plastic, and the like.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
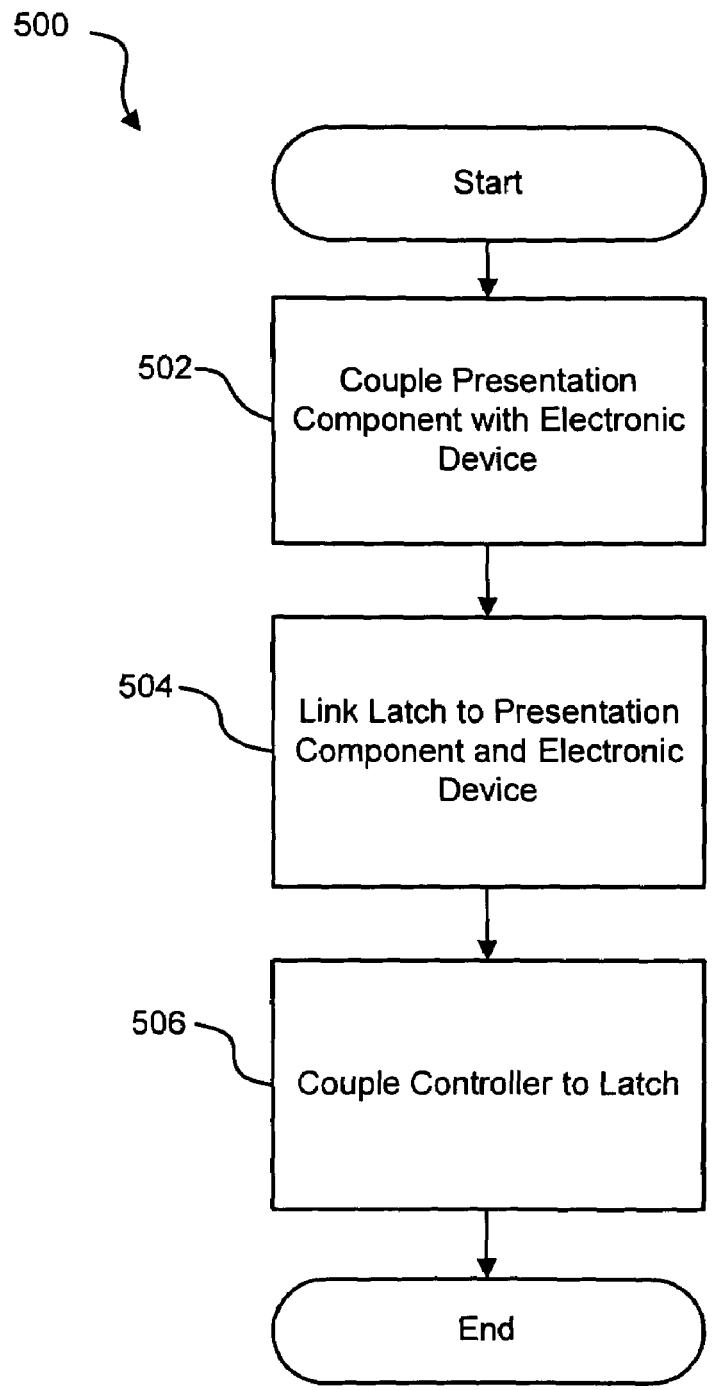
FIG. 5 is a schematic flow chart diagram illustrating one embodiment of an electronic device in accordance with the present invention.

FIG. 5 depicts a flow chart for a method 500 for securely associating ownership information with an electronic device. Initially, a user couples 502 the presentation component 104 with the electronic device 100. The user may couple 502 the presentation component 104 with the electronic device 100 during the manufacturing process of the electronic device 100.

In an alternative embodiment, the user may couple 502 the presentation component 104 with the electronic device 100 after the electronic device 100 is manufactured. For example, a user may couple 502 the presentation component 104 to the electronic device 100 at a pre-formed connection point with a fastener. An example of a pre-formed connection point and fastener is a hole configured to accept a barbed pin. In another embodiment, the presentation component 104 could be coupled 502 with an existing electronic device 100 with adhesive. In another embodiment, the presentation component 104 could be coupled 502 with an existing electronic device 100 by welding the presentation component 104 to the electronic device 100.

Next, the user links 504 a latch 212 to the presentation component 104 and the electronic device 100. The user may link 504 the latch 212 with the presentation component 104 and the electronic device 100 during the manufacturing process of the electronic device 100.

In an alternative embodiment, the user may link 504 the latch 212 to the presentation component 104 and the electronic device 100 after the electronic device 100 is manufactured. For example, a user could link 504 the latch 212 to the presentation component 104 and the electronic device 100 at a pre-formed linking point. In another embodiment, the latch 212 could be linked 504 to the presentation component 104 and an existing electronic device 100 with adhesive. In another embodiment, the latch 212 could be linked 504 to the presentation component 104 and an existing electronic device 100 by welding the latch 100 to the electronic device 100.

Finally, the user couples 506 a controller 208 to the latch 212. In one embodiment, the user may couple 506 the controller 208 to the latch 212 during the manufacturing process of the electronic device 100.

In another embodiment, the user may couple 506 the controller 208 to the latch 212 after the electronic device 100 is manufactured. For example, the user may couple 506 the controller 208 to the latch 212 at a pre-formed coupling point with a fastener. In an alternative embodiment, the user may couple 506 the controller 208 to the latch 212 with adhesive or through welding.

Figure 6:
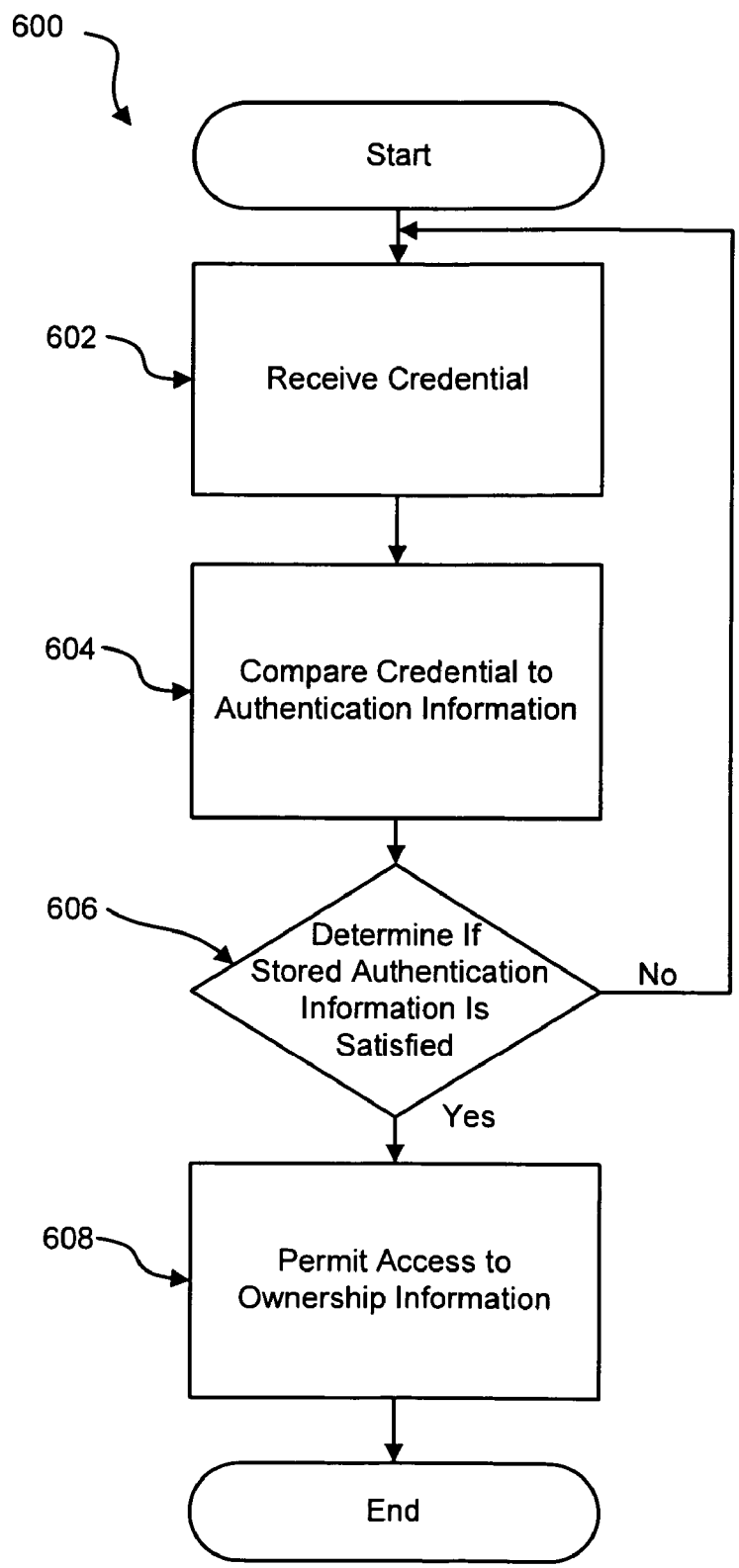
FIG. 6 is a schematic flow chart diagram illustrating one embodiment of an electronic device in accordance with the present invention.

FIG. 6 depicts a flow chart for a method 600 for securely associating ownership information 102 with an electronic device 100. Initially, the user interface module 304 receives 602 a credential 302. The credential 302 is typically received 602 from a user who wishes to modify ownership information 102. Once the credential 302 is received 602, it can be used to determine if the user is an authenticated user. In one embodiment, the credential 302 is a password. Alternatively, the credential 302 may be a key 402.

As will be appreciated by those skilled in the art, a variety of ways of receiving 602 a credential 302 can be utilized without departing from the scope and spirit of the present invention. For example, in one embodiment, the credential 302 is a biometric identifier, such as a fingerprint a retina, or the like, and receiving 602 the credential 302 comprises scanning the biometric identifier.

Next, the authentication module 306 compares 604 the received credential 302 to stored authentication information 310. The stored authentication information 310 determines the proper credential 302 for authenticating a user. If the credential 302 satisfies the stored authentication information 310 the user is deemed to be authenticated. In one embodiment, the credential 302 is a password, and the stored authentication information 310 is the same password. Comparing 604 the credential 302 and the stored authentication information 310 comprises comparing 604 them for an exact match.

As will be appreciated by those skilled in the art, a variety of ways of comparing 604 the stored authentication information 310 with the received credential 302 can be utilized without departing from the scope and spirit of the present invention. For example, in one embodiment, the credential 302 is a password, and the stored authentication information 310 is an encrypted version of the same password. Comparing 604 the credential 302 and the stored authentication information 310 comprises decrypting the stored authentication information 310 comparing 604 it with the received credential 302 for an exact match.

In another embodiment, the credential 302 comprises a key 402, and the stored authentication information 310 comprises a lock 404. Comparing 604 the credential 302 and the stored authentication information 310 comprises inserting the appropriate key 402 into the lock 404. In yet another embodiment, the credential 302 comprises a biometric identifier, such as a finger print or a retina, and the stored authentication information 310 comprises information that corresponds to a scanned version of the biometric identifier. Comparing 604 the credential 302 and the stored authentication information 310 comprises comparing the scanned biometric identifier with the stored authentication information 310.

Next, the authentication module 306 determines 606 if the stored authentication information 310 is satisfied. This determination is based on a comparison 504 of the credential 302 to the stored authentication information 310. If the credential 302 satisfies the stored authentication information 310, the user is deemed an authenticated user with rights to access the ownership information 102. If the stored authentication information 310 is not satisfied, the user is not deemed an authenticated user, and the user is not granted access to the ownership information 102.

Finally, the controller 208 permits 608 access to the ownership information 102 if the stored authentication information 310 is satisfied. Once the controller 208 permits 608 access to the ownership information 102, an authenticated user can modify the ownership information 102 to reflect changes in rights to possession of the electronic device.

As will be appreciated by those skilled in the art, a variety of ways of permitting 608 access to the ownership information 102 can be utilized without departing from the scope and spirit of the present invention. For example, in one embodiment, a controller 208 changes the state of a latch 212 from a secured state to a released state, allowing access to the ownership information 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for securely associating ownership information with an electronic device, comprising:

coupling a presentation component comprising a transparent pane to an electronic device, the presentation component configured to contain ownership information and to display the ownership information through the transparent pane, wherein the ownership information identifies an authorized possessor of the electronic device;

wherein the presentation component further comprises an encasement configured to contain the ownership information behind the transparent pane;

connecting a latch to the presentation component and to the electronic device, the latch configured to prevent access to the ownership information by unauthorized persons in response to the latch being in a secured state, and to allow access to the ownership information in response to the latch being in a released state;

providing a user interface that accepts a credential from a user; and coupling a controller to the latch, the controller configured to free the latch to allow access to the ownership information by putting the latch in the released state in response to the credential presented by the user being a proper credential.

2. The method of claim 1, wherein the ownership information is a business card having ownership information.

3. The method of claim 1, wherein the presentation component is further configured to show evidence of tampering attempts.

4. The method of claim 1, wherein the electronic device is a portable computing device.

5. The method of claim 1, wherein the controller is configured to allow an authenticated user to modify the ownership information.

6. An apparatus for securely associating ownership information with an electronic device comprising:
   a presentation component comprising a transparent pane integrated with an electronic device, the presentation component configured to contain ownership information and to display the ownership information through the transparent pane, wherein the ownership information identifies an authorized possessor of the electronic device;
   wherein the presentation component further comprises an encasement configured to contain the ownership information behind the transparent pane;
   a latch connected to the presentation component and to the electronic device, the latch configured to prevent access to the ownership information by unauthorized persons in response to the latch being in a secured state, and to allow access to the ownership information in response to the latch being in a released state;
   a user interface that accepts a credential from a user; and
   a controller coupled to the latch, the controller configured to free the latch to allow access to the ownership information by putting the latch in the released state in response to the credential presented by the user being a proper credential.

7. The apparatus of claim 6 wherein the controller is configured to encrypt stored authentication information.

8. The apparatus of claim 6 wherein the user interface is further configured to allow an authorized user to change the credential.

9. The apparatus of claim 6, wherein the encasement is configured to contain a message media comprising ownership information.

10. The apparatus of claim 6, wherein the presentation component is further configured to show evidence of tampering attempts.

11. The apparatus of claim 6 wherein the electronic device is a portable computing device.

12. A system for securely associating ownership information with an electronic device comprising:
    an electronic device;
    a presentation component comprising a transparent pane integrated with the electronic device, wherein the presentation component is configured to contain ownership information and to display the ownership information through the transparent pane, wherein the ownership information identifies an authorized possessor of the electronic device;
    wherein the presentation component further comprises an encasement configured to contain the ownership information behind the transparent pane; a latch connected to the presentation component and the electronic device, the latch configured to prevent access to the ownership information by unauthorized persons in response to the latch being in a secured state, and to allow access to the ownership information in response to the latch being in a released state;
    a user interface that accepts a credential from a user; and
    a controller coupled to the latch, the controller configured to free the latch to allow access to the ownership information by putting the latch in the released state in response to the credential presented by the user being a proper credential.

13. The system of claim 12 wherein user interface is further configured to allow an authenticated user to modify the credential.

14. The system of claim 12, wherein the encasement is further configured to contain a message media comprising ownership information.

15. The system of claim 12, wherein the presentation component is further configured to show evidence of an unauthorized attempt to access the message media.

16. The system of claim 12, wherein the electronic device is a portable computing device.

17. An apparatus for securely associating ownership information with an electronic device comprising:
    a presentation component comprising a transparent pane integrated with a portable device, the presentation component configured to contain ownership information and to display the ownership information through the transparent pane, wherein the ownership information identifies an authorized possessor of the electronic device;
    wherein the presentation component further comprises an encasement configured to contain the ownership information behind the transparent pane;
    a latch connected to the presentation component and the portable device, the latch configured to prevent access to the ownership information by unauthorized persons in response to the latch being in a secured state, and to allow access to the ownership information in response to the latch being in a released state;
    providing a user interface that accepts a credential from a user; and
    a lock coupled to the latch, the lock configured to free the latch to allow access to the ownership information by putting the latch in the released state in response to the credential presented by the user being a proper credential.

18. The apparatus of claim 17, wherein the credential is a key, and wherein the lock is configured to free the latch in response to the turning of a key.

19. The apparatus of claim 17, wherein the electronic device is a portable computing device.

20. A computer readable storage medium tangibly embodying a program of machine readable instructions executable by a digital processing apparatus to perform operations to securely associate ownership information with an electronic device, comprising:
    receiving a credential from a user entered at a user interface;
    comparing the credential to stored authentication information that is stored in a memory of a controller that controls a latch of a presentation component, the latch configured to prevent access to ownership information by unauthorized persons in response to the latch being in a secured state, and to allow access to ownership information in response to the latch being in a released state;
    permitting access to the ownership information stored in the presentation component affixed to the electronic device by putting the latch in the released state in response to the credential presented by the user satisfying the authentication information.

21. The computer readable storage medium of claim 20 wherein the credential comprises a password.

22. The computer readable storage medium of claim 20 wherein the stored authentication information is encrypted.

* * * * *

UNITED STATES PATENT AND TRADEMARK OFFICE
CERTIFICATE OF CORRECTION

PATENT NO. : 7,647,369 B2  Page 1 of 1
APPLICATION NO. : 11/363634
DATED : January 12, 2010
INVENTOR(S) : Robert S. Hoblit It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Sixteenth Day of November, 2010

David J. Kappos
*Director of the United States Patent and Trademark Office*